United States Patent [19]

Rubik

[11] Patent Number: 5,042,118
[45] Date of Patent: Aug. 27, 1991

[54] CLAMPING DEVICE

[75] Inventor: Erno Rubik, Budapest, Hungary

[73] Assignee: Rubik Studio Muszaki Fejleszto Kisszovetkezet, Budapest, Hungary

[21] Appl. No.: 473,931
[22] PCT Filed: Sep. 13, 1988
[86] PCT No.: PCT/HU88/00060
 § 371 Date: Jan. 24, 1990
 § 102(e) Date: Jan. 24, 1990
[87] PCT Pub. No.: WO89/09302
 PCT Pub. Date: Oct. 5, 1989

[30] Foreign Application Priority Data

Mar. 25, 1988 [HU] Hungary ............................ 1522/88

[51] Int. Cl.5 .......................................... A44B 21/00
[52] U.S. Cl. .......................................... 24/523; 24/509
[58] Field of Search ............... 211/523, 509, 517, 308, 211/338, 339, 712.3, 34, 119

[56] References Cited

U.S. PATENT DOCUMENTS

| 904,595 | 11/1908 | Barmore . | |
|---|---|---|---|
| 2,278,735 | 4/1942 | Perry | 24/509 |
| 2,455,258 | 11/1948 | Levitin | 24/338 |
| 2,482,625 | 9/1940 | Kunkel . | |
| 2,524,537 | 10/1950 | Osmonson . | |
| 3,203,061 | 8/1965 | Thomas | 24/338 |
| 3,509,882 | 5/1970 | Blake | 24/523 |
| 4,106,508 | 8/1978 | Berlin . | |
| 4,368,823 | 1/1983 | Beckwith . | |
| 4,388,747 | 6/1983 | Plummer . | |
| 4,536,926 | 8/1985 | Pantaleo | 24/523 |
| 4,583,269 | 4/1986 | Harris | 24/523 |
| 4,669,615 | 6/1987 | Bigman | 211/119 |

FOREIGN PATENT DOCUMENTS

| 102024 | 3/1931 | Hungary . |
| 31724 | 8/1904 | Switzerland . |
| 815952 | 7/1959 | United Kingdom . |

Primary Examiner—Victor N. Sakran
Attorney, Agent, or Firm—Michael N. Meller

[57] ABSTRACT

A clamping device for releasably clamping an article has a pair of arm members. Each arm member has a clamping jaw at an end thereof. The arm members are arranged with the clamping jaws in opposition and are interconnected kinematically to enable movement relative to each other in a predetermined direction to attain a self-locking relationship. A spring assembly is provided coupled to the arm members for urging the clamping jaws toward each other to grip the article. A loose fit linear guide is arranged parallel to and a predetermined distance from a line along which a clamping force of the clamping jaws is exerted on the article. The spring assembly is pre-stressed and located in close proximity to this slide guide.

15 Claims, 5 Drawing Sheets

CLAMPING DEVICE

TECHNICAL FIELD OF THE INVENTION

The invention relates to a clamping device for releasably clamping an article such as clothing on rails, drying ropes or the like. Such clamping device comprises a pair of opposed arm members provided with clamping jaws at their. The arm members are interconnected kinematically so as to be capable of relative movement with respect to each other. The clamping device further comprises a spring assembly urging the arm members and thus, the clamping jaws toward one another to grip the article therebetween.

BACKGROUND ART

The following U.S. patents pertain to spring clamps, clips and similar devices. None of these, however, discloses a clamp having the features of the present invention. U.S. Pat. Nos. 2,524,537 and 3,203,061. U.S. Pat. No. 4,388,747 discloses a clip provided with a hinge that is materially integral with a pair of clamping means. The whole device is made of thermoplastics, and the arms are substantially extended in the area of the hinge.

For a wide range of applications, clamping devices provided with clamping jaws or jaw-forming members that are movable along a linear path have also become known. Hungarian Patent Specification No. 102,024 describes a clamping head of such type for a memo-pad, while U.S. Pat. No. 4,368,823 discloses a hanging necktie holder that holds ties through the use of clamps which press the ties against the crossarm over which they are draped. In U.S. Pat. No. 4,106,508 a surgical clamp for the occlusion of blood vessels or other tubular conduits in human or other animal bodies is described that also follows the principle of linear jaw movement. The common characteristic feature of all prior art devices lies in that the attainable clamping force never exceeds the force stored in the spring element used, and release of the clamping device to allow removal of the article from between the jaw-forming members has to be effected by squeezing the handle portions of the device toward one another to open the jaws against the full spring action.

SUMMARY OF THE INVENTION

An important object of the present invention is to provide a clamping device by which a clamping or gripping force that exceeds the force stored in the tensioned, compressed spring element of the clamp can be exerted and maintained onto the article between the clamping jaws of the device. Another object of the invention is to provide a clamping device in which the increased gripping force mentioned above yields increased clamping and holding safety while easy handling and releasing characteristics, together with simple, aesthetic design and appearance are also achieved. A still further object of the present invention lies in the provision of a clamping device that has wide application.

Generally considered, the clamping device of the present invention is composed of a pair of opposed arm members provided with clamping jaws at their respective ends. The arm members are interconnected kinematically so as to be capable of relative movement with respect to each other. The clamping device further comprises a spring assembly urging the arm members and thus, the clamping jaws toward one another to grip the article therebetween. The novel features of the above-described clamping device according to the present invention are characterized in that the arm members are interconnected by means of a loose fit linear slide guide which is arranged parallel to and in a definite spaced relationship with the force line of the clamping force that is exerted by the clamping jaws on the article gripped therebetween, and that the spring assembly is pre-stressed and located in proximity to the slide guide.

In a preferred embodiment, the arm members are inter- or overcrossed whereby the clamping jaws are urged to grip the article clamped therebetween by a compression force stored in the pre-stressed spring assembly, and the spring assembly comprises at least one preferably coil-type compression spring the force line of which is aligned or at least very nearly parallel with the slide guide.

In a further preferred embodiment the arm members of the clamping device have matching wall partitions and/or key ribs registering in slots forming the slide guide at their one ends when mounted together. The arm members are designed and shaped as substantially rigid component parts preferably made of a suitable thermoplastic material, and they are assembled and held together by the loose fit linear slide guide.

In a still further preferred embodiment the ends of the arm members that form the slide guide when mounted together, are shaped so as to provide an at least partially closed spring casing having wall partitions, and also rear walls that are substantially perpendicular to the force line of the at least one compression spring located within the spring casing whereby the rear walls serve as spring end supports for the at least one compression spring.

In order to enlarge the field of applicability, preferred embodiments of the clamping device according to the present invention may also have a suspender or connecting member provided with a tongue end that protrudes, between and substantially parallel to the spring supporting rear walls, into the spring casing for relative movement from and toward the rear walls, and the spring assembly comprises a pair of preferably coil-type compression springs supported, at their one ends, by the rear walls, and separated and supported, at their other ends, by the protruding tongue end of the suspender or connecting member.

The end of at least one of the arm members that forms one part of the loose fit slide guide and/or the suspender or connecting member may also be provided with a means, particularly with a thorough hole or an eye, for stringing the clamping device on a rope- or rod-like holder, preferably a drying rope, a clothes rack or the like. Simultaneously or alternatively, the end of at least one of the arm members that forms one part of the slide guide may be designed and shaped for being capable of attaching or fastening the clamping device either directly or by using a distance adapter member, to a plane, preferably vertical bearing surface, particularly to any suitable wall surface.

BRIEF DESCRIPTION OF THE DRAWINGS

FIG. 5 is a diagrammatic perspective sketch of the pair of arm members forming the loose fit slide guide and the spring casing at their one end when mounted together, while

MODES FOR CARRYING OUT THE INVENTION

Figure 1:
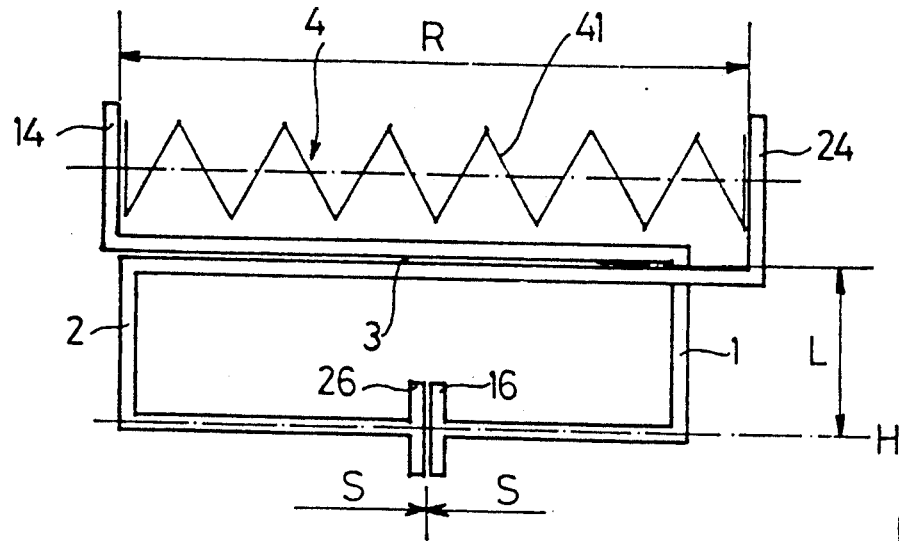
FIG. 1 shows the basic kinematic structure of the clamping device according to the present invention.
Figure 3:
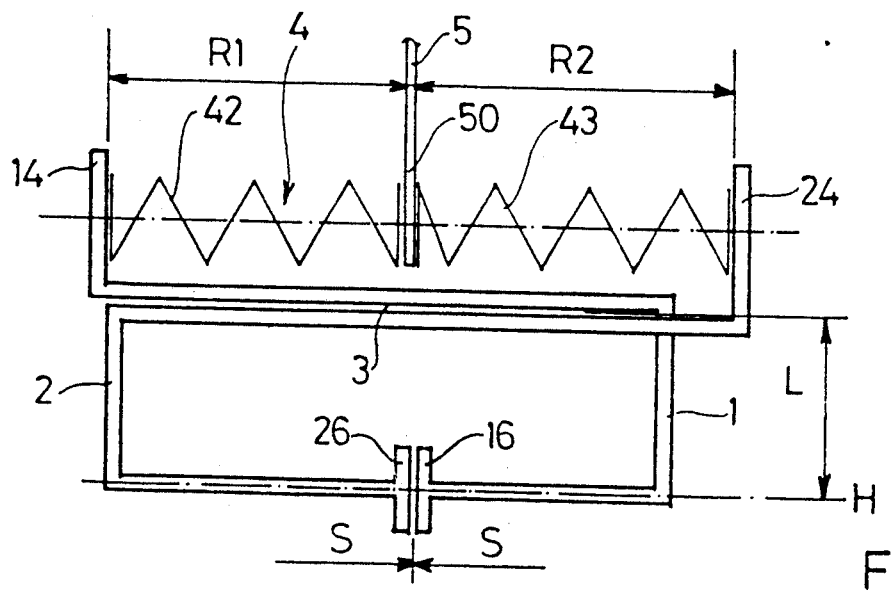
FIG. 3 shows the basic structure of another preferred embodiment of the invention.
Figure 2:
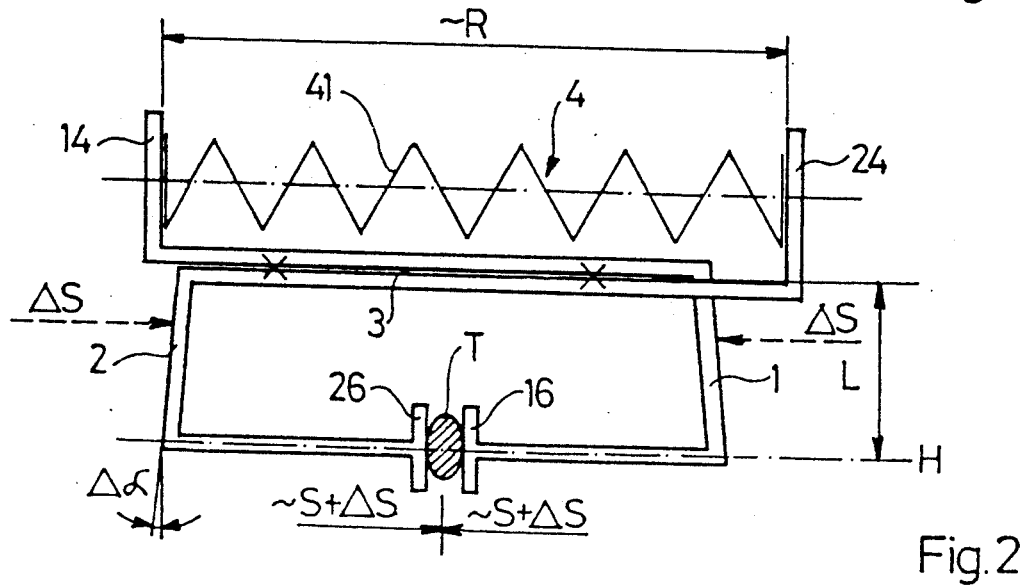
FIG. 2 is a diagrammatic drawing of the clamping device of the invention for the purpose of describing its mode of operation.

Referring now more particularly to the accompanying drawings and initially to FIGS. 1 to 3, from the very simplified basic kinematic structure of the clamping device as shown it becomes apparent that the clamping device according to the present invention essentially comprises a pair of opposed arm members 1, 2 provides with clamping jaws 16, 26 at their one end. The arm members 1, 2 are capable of linear movement with respect to each other since they are interconnected kinematically by means of a loose fit linear slide guide 3. A spring assembly 4 urges the arm members 1, 2 and thus, the clamping jaws 16, 26 toward one another to grip an article T therebetween as is clearly shown in FIG. 2. The loose fit linear slide guide 3 is arranged in a distance L parallel to and thus, in a definite spaced relationship with the force line H of the clamping force S that is exerted by the clamping jaws 16, 26 on each other when the spring assembly 4 (comprising a slightly pre-stressed compression spring 41) is in its initial, normal position of operation with no article clamped between the clamping jaws 16, 26. The spring assembly 4, in particular said compression spring 41, is located in close proximity to the slide guide 3.

If friction forces are disregarded, the clamping force S corresponds with spring force R stored in the pre-stressed compression spring 41 initially (FIG. 1). This force S has to be overcome when the clamping device is opened. Obviously, the compression force S increases linearly with the structural thickness of the article T to be gripped. From the point of view of the present invention, however, this can be neglected as will become clear and apparent from the following description of the mode of operation of the device with reference to FIG. 2 of the attached drawing.

FIG. 2 illustrates the embodiment of the clamping device according to FIG. 1 in a state of gripping an article T between the clamping jaws 16, 26. For the sake of easier understanding FIGS. 1 to 3 are distorted considerably. Because of the relative small thickness of the article T, the spring force stored in the pre-stressed compression spring 41 will be approximately equal to the value R.

After having placed and clamped the article T between the clamping jaws 16 and 26, in an area between the slide guide 3 and the force line H of the clamping force S (which are, according to the spirit of the present invention, in spaced relationship with respect to each other by a distance L) an additional clamping force amounting to $\Delta S$ is applied against the arm members 1 and 2 from both sides manually. As a result, a slight deformation (illustrated by an angular displacement $\Delta \alpha$ in FIG. 2) of said arm members 1, 2 is generated. Such deformation is allowed by the immanent elasticity of the (otherwise rigid) arm members 1, 2 made from properly chosen material by the loose fit within the slide guide 3. Such deformation is practically not perceptible, but it still causes the two fitting parts of the slide guide 3 to have additional movement relative to each other until their mutual self-locking state, well known to those duly skilled in the art of slide guides, is reached. At this stage, it should be noted that the additional clamping force $\Delta S$ applied manually can usually be considerably greater than the normal clamping force S resulting from the relatively tender spring force R. In the self-locking stage of the linear slide guide 3 however, the increased clamping force of $S+\Delta s$ exerted on the article T is preserved (stored) and maintained within the clamping device until further manual intervention. This means that even after ceasing the manual impact on the arm members in the area as mentioned above, a secure and constant gripping force of $S'\Delta S$ is maintained against the article T clamped between the clamping jaws 16, 26 without further action.

Release of the clamping device to allow removal of the article T from between the clamping jaws 16, 26 is effected by squeezing the arm members 1, 2 toward one another manually, preferably in the area of their ends opposite to the other ends forming the clamping jaws 16, 26. These ends are indicated in FIGS. 1 to 3 by rear walls 14, 24 supporting the ends of the compression spring 41 (FIGS. 1 and 2) or compression springs 42, 43 (FIG. 3) which will be dealt with in detail below.

The main advantage of the clamping device according to the present invention, namely its capability of durably exerting an increased gripping force on the article clamping between the clamping jaws, clearly results from the concise of the invention which is duly described above. Despite using a relatively tender spring assembly with minimum spring force stored by initial pre-stressing a considerably high clamping force can be exerted on the article to be clamped whereby a durably secure gripping effect is achieved and maintained. In addition to this, release of the clamping device can also be effected easily. The same applies to holding the device open while the article to be clamped is being inserted in the area between the opened jaws.

FIG. 3 shows another preferred embodiment of the clamping device in the same very simplified manner of illustration. Here, a suspender or connecting member 5 (not fully shown) provided with a tongue end 50 that protrudes between and is substantially parallel to the spring supporting rear walls 14, 24, is also guided for relative movement form and toward said rear walls 14, 24. The spring assembly 4 comprises a pair of coil-type compression springs 41, 42 which identical and prestressed to store a spring force of R1, R2 each, respectively. Since the compression springs 41, 42 are connected in series, the resulting spring force will amount of $R=R1+R2$, while $R1=R2$. With these conditions maintained the mode of operation of this embodiment is in full conformity with what has already been described above with reference to FIGS. 1 and 2. The compression springs 42, 43 are supported, at their respective outer ends by the rear walls 14, 24 while in the middle at their other ends they are separated and supported by the movably guided protruding tongue end 50 of the suspender or connecting member 5. The latter may perform different functions such as hanger hook means for attaching or hanging a number of clamping devices to or next to each other etc. when using it for suspending the clamping device, the main advantage of the above-described design as per FIG. 3 lies in that said suspender or connecting member 5 always maintains its symmetrical position with respect to the arm members 1, 2 and thus, the clamping jaws 16, 26, this position being substantially aligned with the vertical force line of gravity independently from the thickness of the article T clamped between the jaws.

Figure 4:
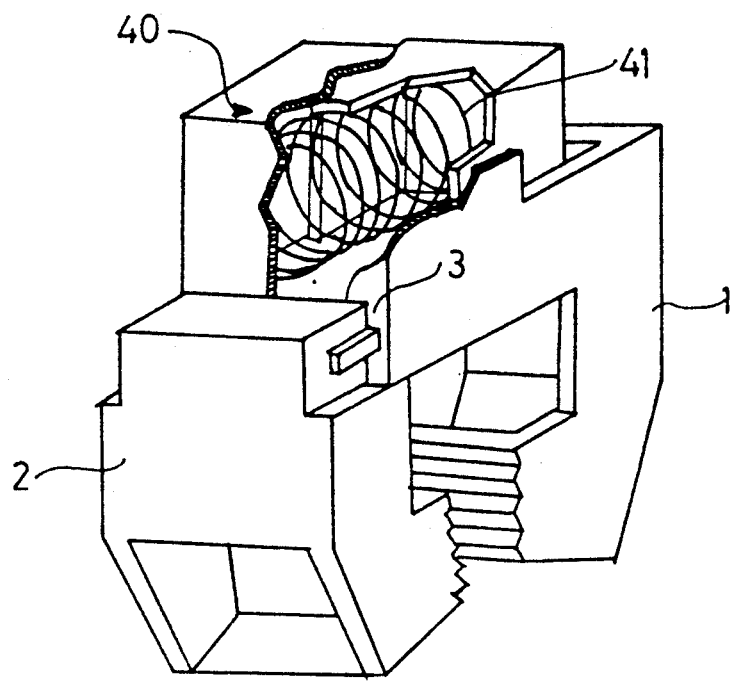
FIG. 4 is a perspective view of an embodiment of the clamping device, partly in section whereby the compression spring is also shown.
Figure 5:
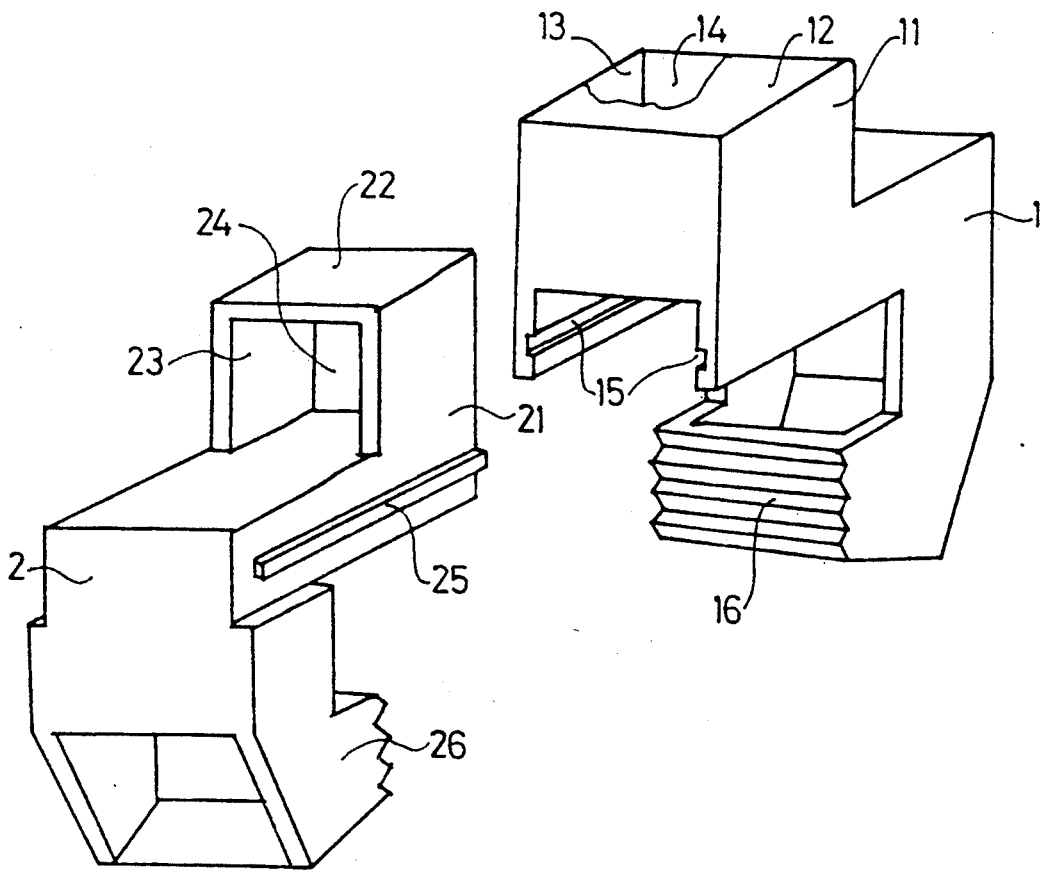

FIGS. 4 and 5 show a particular, preferred embodiment of the clamping device according to the present invention in a fully detailed manner for the purpose of clear understanding. From FIGS. 4 and 5 it is apparent that the arm members are intercrossed or rather intercrossing each other so that the clamping jaws 16, 26 are urged to grip the article to be clamped there between by a compression force stored in the pre-stressed spring assembly 4 which comprises a coil-type compression spring 41 the force line of which is very close to and parallel to the slide guide 3. The arm members 12 and 2 have matching wall partitions 11, 12, 13 and 21, 22, 23 and in addition to this, key ribs 25 registering in slots 15, whereby the loose fit slide guide 3 is formed at their one ends when mounted together. The arm members 1, 2 are provided with clamping jaws 16, 26 of indented gripping surface. It can clearly be seen that they are designed and shaped as substantially rigid component parts which can preferably be manufactured of any suitable thermoplastic material e.g. by injection molding. The upper ends of the arm members 1, 2 that are joined together and form the slide guide 3 when the clamping device is mounted are shaped so as to provide a closed spring casing 40 formed by the wall partitions 11, 12, 13 and 21, 22, 23 and by rear walls 14, 24 that are perpendicular to the force line of the compression spring 41 located within the spring casing 40. Thus, the rear walls 14, 24 serve s spring end supports for the slightly pre-stressed compression spring 41. Such embodiments of the clamping device according to the present invention provide aesthetically attractive and decorative structural units wherein the compression spring 41 is hidden and well protected, and the wall surfaces can (besides the increasing inertia and thus, rigidity of the arm members) serve the purpose of being covered by graphical elements, patterns, advertisements or any other surfacial finishing of decorative character.

Although not shown in the drawing figures, the rear walls 14, 24 can be provided with co-axial through hole aligned with the longitudinal axis line of the coil-type compression spring 41. If so, a number of clamping devices can be strung on any rope- or rod-type holder, preferably a drying rope, a clothes rack or the like.

Figure 6:
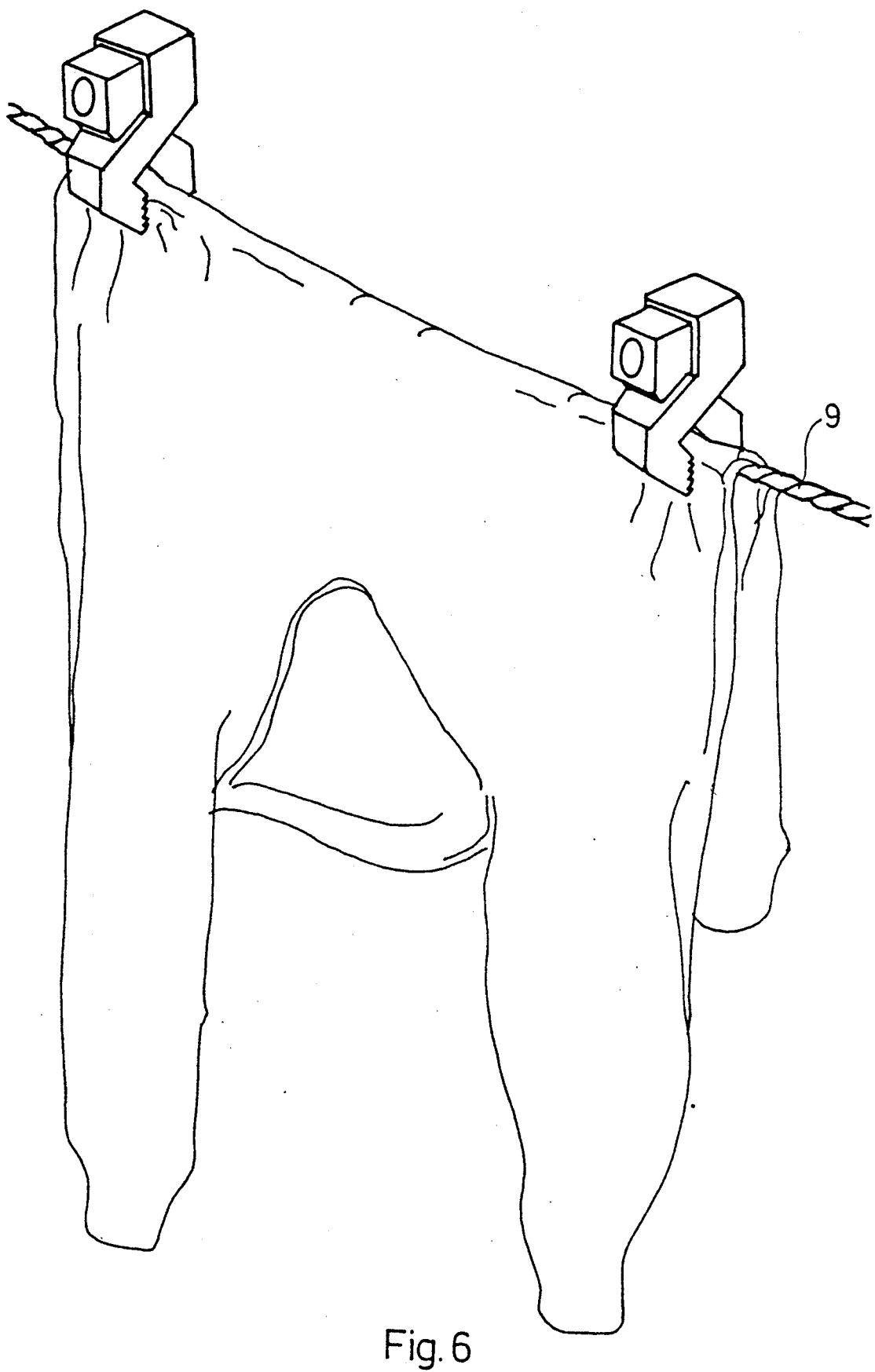
FIGS. 6 to 8 are schematic illustrations, by way of example only, of some preferred embodiments of the clamping device according to the present invention whereby some fields of application are demonstrated.
Figure 7:
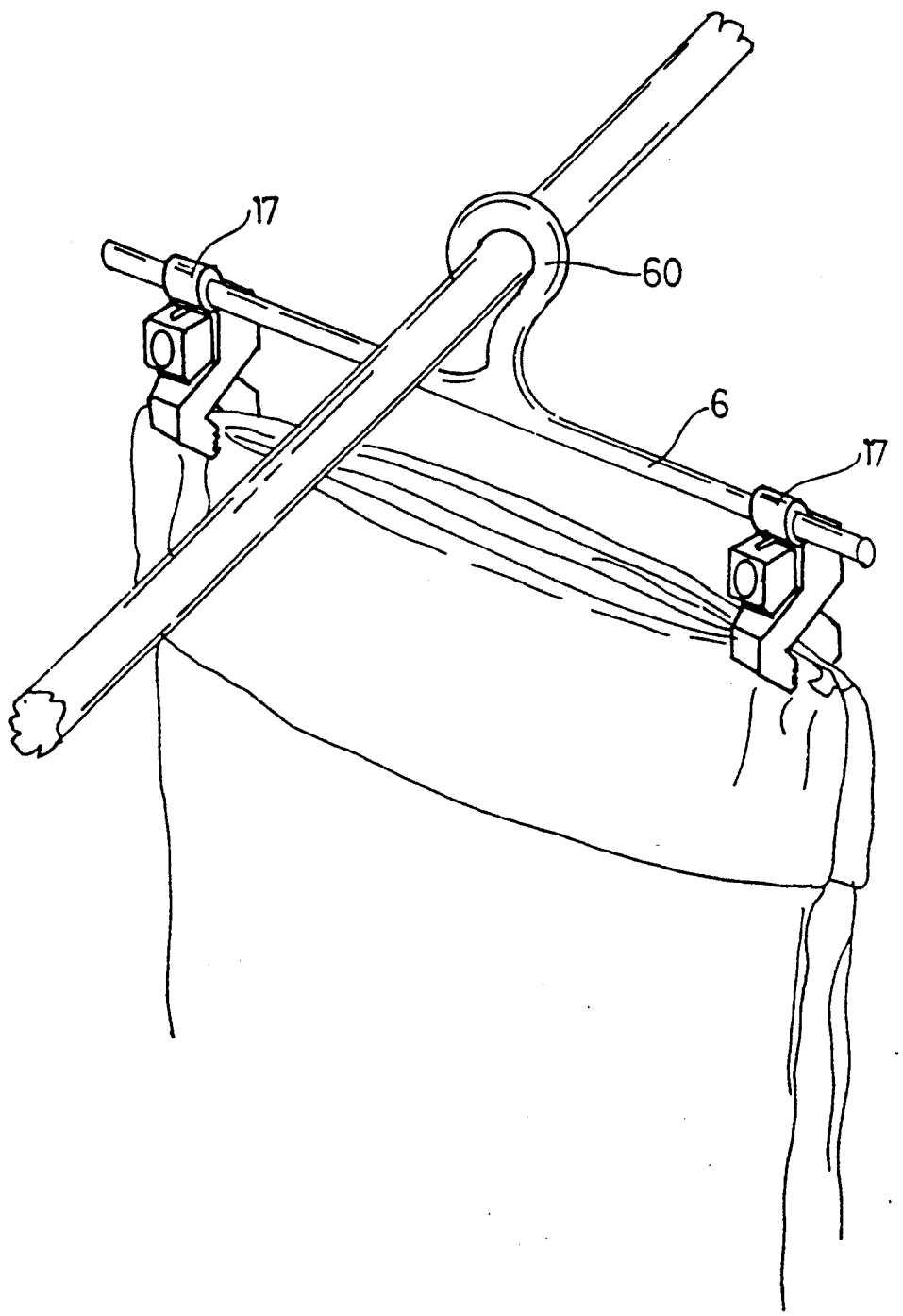

In one application, the clamping device according to the invention may be used for gripping a garment or clothing draped over a drying rope 9 as shown in FIG. 6 so as to prevent the clothing from slipping off the rope. Another preferred embodiment of the clamping device according to the present invention is illustrated in FIG. 7. At the upper end of one of the arm members an eye 17 is integrally formed. By using such eye 17 the clamping device can be strung on a clothes rack 6 having a handle hook 60.

Figure 8:
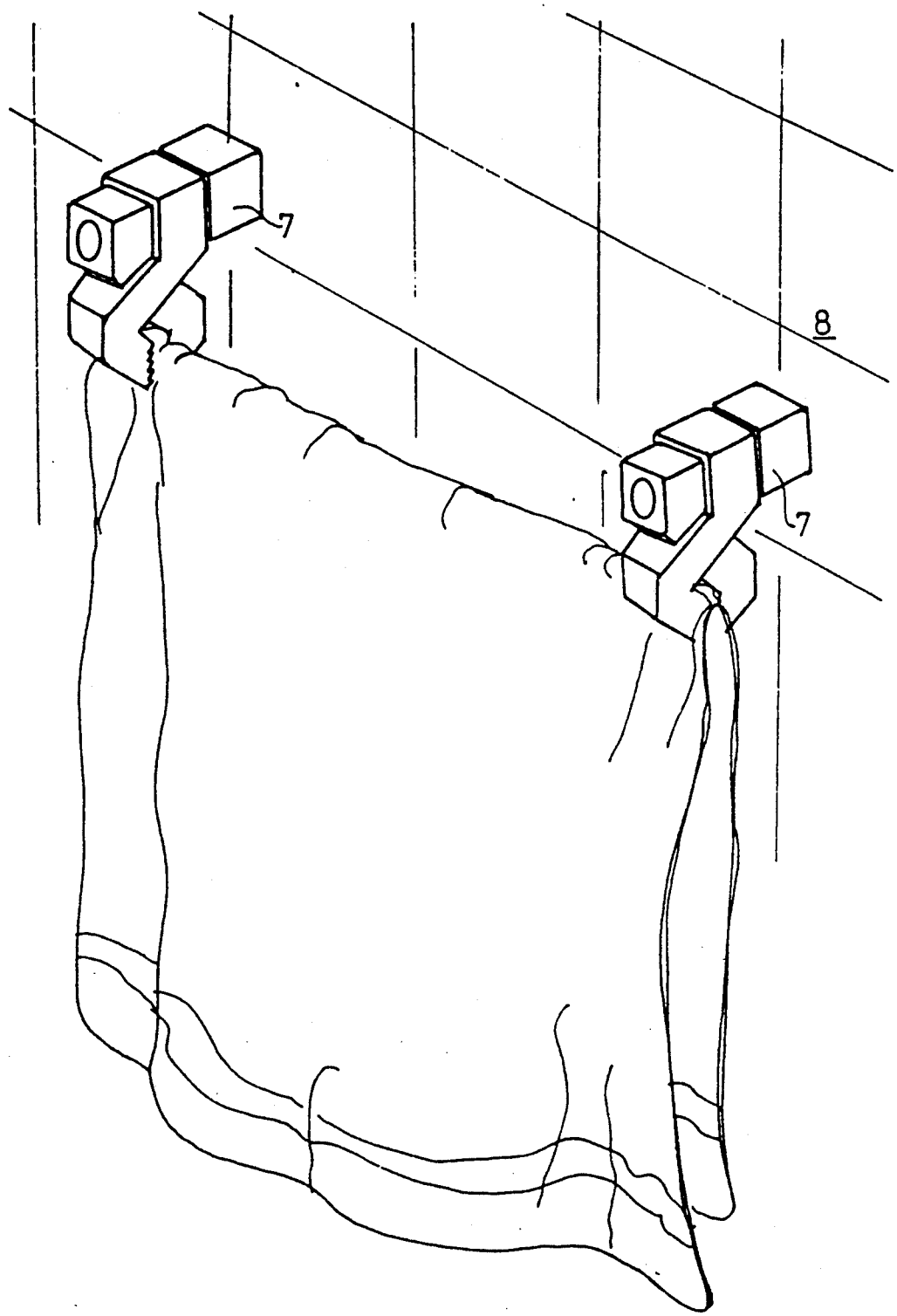

FIG. 8 shows a slightly modified embodiment of the present invention in another field of application. Here, the end of at least one of said arm members 1, 2 that forms one part of the slide guide 3 is designed and shaped for being capable of fastening the clamping device either directly or by using a distance adapter member 7 as shown in FIG. 7 to a plane, preferably vertical bearing surface, particularly to any suitable wall surface 8 as per FIG. 7.

INDUSTRIAL APPLICABILITY

From the above detailed description of the invention it will be readily apparent that besides embodiments of the clamping device such as a household article of mass product character, a garment clamp for drying purposes, and a candle holder clip for Christmas tress, it also can be used for clipping stationary, for developing and drying photographs, for clipping note pads, drawings and diagrams onto vertical bearing surfaces, for use as a fashion article (badge, ear clip, etc.), as a hair-clip or for different other commercial purposes.

Technological fields of application are e.g. welding of metal parts such as car bodies where it can be shaped and used as a spring-actuated quick clamp. Further applications are possible in laboratories both for research and medicine as forceps or a vascular clamp for use for non-permanent occluding of blood vessels and other fluid ducts in an animal or a human body.

A primary advantage of the clamping device according to the present invention lies in that it maintains any addition gripping force through self-locking of the slide guide whereby the attainable clamping force is independent of the spring force. The thickness of the articles to be clamped may vary in a wide range while substantially the same gripping characteristics of the device are maintained. The gripping surfaces of the clamping jaws remain parallel in every position. Thus, optimum surface gripping for every application can be provided for. The device can be manufactured of any suitable and available material. The spring assembly and the linear slide guide surfaces are hidden and well protected against corrosion and/or damage.

The design and working principle of the device enable one-hand manipulation of the clamp for the user. The clamping device according to the present invention can be manufactured as a mass product on a large series scale at very low cost.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

| List of Reference Signs of the Drawings |
| --- |
| 1 arm member |
|     11,12,13 wall partition |
|     14 rear wall |
|     15 slot |
|     16 clamping jaw |
|     17 eye |
| 2 arm member |
|     21,22,23 wall partition |
|     24 rear wall |
|     25 key rib |
|     26 clamping jaw |
| 3 slide guide |
| 4 spring assembly |
|     40 spring casing |
|     41,42,43 compression spring |
| 5 suspender or connecting member |
|     50 tongue end |
| 6 clothes rack |
|     60 handle hook |

-continued

List of Reference Signs of the Drawings 7 distance member
8 wall
9 drying rope
S clamping force
H influence line
R, R1, R2 spring force
T article
L distance
Δ α angular displacement

I claim:

1. A clamping device for releasably clamping an article comprising:
   a pair of arm members, each arm member having a clamping jaw at an end thereof, said arm members being arranged with said clamping jaws in opposition and being interconnected kinematically to enable movement relative to each other in a predetermined direction to attain a self-locking relationship;
   a spring assembly coupled to said arm members for urging said clamping jaws toward each other to grip said article; and
   a loose fit linear slide guide arranged parallel to and a predetermined distance from a line along which a clamping force of said clamping jaws is exerted on said article, wherein said spring assembly is pre-stressed and located in close proximity to said slide guide.

2. A clamping device as claimed in claim 1 characterized in that said arm members (1, 2) are crossed, whereby the clamping jaws (16, 26) are urged to grip the article (T) clamped therebetween by a compression force stored in the pre-stressed spring assembly (4), and that said spring assembly (4) comprises at least one coil-type compression spring (41 or 42, 43) the force line of which is substantially aligned with said guide (3).

3. A clamping device as claimed in claim 2 characterized in said arm members (1 and 2) having matched wall partitions (11, 12, 13 and 21, 22, 23) and key rigs (25) registering in slots (15) forming said slide guide (3) at their one ends when mounted together, said arm members (1, 2) being provided with clamping jaws (16, 26) of indented gripping surface at their other ends, and said arm members (1, 2) being designed and shaped as substantially rigid component parts made of any suitable thermoplastic material that are assembled and held together by said loose fit linear slide guide (3).

4. A clamping device as claimed in claim 3 characterized in that the ends of the arm members (1, 2) that form said slide guide (3) when mounted together are shaped so as to provide an at least partially closed spring casing (40) having wall partitions (11, 12, 13 and 21, 22, 23), and said spring casing (40) also having rear walls (14, 24) that are substantially perpendicular to the influence line of said at least one compression spring (41 or 42, 43) located within said spring casing (40) whereby said rear walls (14, 24) serve as spring end supports for said at least one compression spring (41 or 42, 43).

5. A clamping device as claimed in claim 4 characterized in also having a suspender or connecting member (5) provided with a tongue end (50) that protrudes, between and substantially parallelly with said spring supporting rear walls (14, 24), into said spring casing (40) and is guided within said spring casing (40) for relative movement from and toward said rear walls (14, 24), and said spring assembly (4) comprising a pair of preferably coil-type compression spring (42, 43) supported at their one ends by said rear walls (14, 24), and separated and supported, at their other ends, by said protruding tongue end (50) of said suspender or connecting member (5).

6. A clamping device as claimed in claim 1 characterized in said arm member s(1 and 23) having matching wall partitions (11, 12, 13 and 21, 22, 23) and key ribs (25) registering in slots (15) forming said slide guide (3) at their one ends when mounted together, said arm members (1, 2) being provided with clamping jaws (16, 26) of indented gripping surface at their other ends, and said arm members (1, 2) being designed and shaped as substantially rigid component parts made of any suitable thermoplastic material that are assembled and held together by said loose fit linear slide guide (3).

7. A clamping device as claimed in claim 3 characterized in that the end of at least one of said arm members (1, 2) that forms one part of said slide guide (3) is designed and shaped for being capable of attaching the clamping device to a plane, bearing surface.

8. A clamping device as claimed in claim 6 characterized in that the ends of the arm members (1, 2) that form said slide guide (3) when mounted together are shaped so as to provide an at least partially closed spring casing (40) having wall partitions (11, 12, 13 and 21, 22, 23), and said spring casing (40) also having rear walls (14, 24) that are substantially perpendicular to the influence line of said at least one compression spring (41 or 42, 43) located within said spring casing (40) whereby said rear walls (14, 24) serve as spring end supports for said at least one compression spring (41 or 42, 43).

9. A clamping device as claimed in claim 8 characterized in that the end of at least one of said arm members (1, 2) that forms one part of said loose fit slide guide (3) and said suspender member (5) are also provided with a means, particularly with a through hole (17), for stringing said clamping device on a holder.

10. A clamping device as claimed in claim 8, characterized in that the end of at least one of said arm members (1, 2) that forms one part of said slide guide (3) is designed and shaped for being capable of attaching or fastening the clamping device either directly or by using a distance adapter member (7) to a plane, preferably vertical bearing surface, particularly to any suitable wall (8) surface.

11. A clamping device as claimed in claim 8 characterized in also having a suspender or connecting member (5) provided with a tongue and (50) that protrudes, between and substantially parallelly with said spring supporting rear walls (14, 24), into said spring casing (40) and is guided within said spring casing (40) for relative movement from and toward said rear walls (14, 24), and said spring assembly (4) comprising a pair of preferably coil-type compression springs (42, 43) supported at their one ends by said rear walls (14, 24), and separated and supported, at their other ends, by said protruding tongue and (50) of said suspender or connecting member (5).

12. A clamping device as claimed in claim 11 characterized in that the end of at least one of said arm members (1, 2) that forms one part of said loose fit slide guide (3) and said suspender member (5) are also provided with a means, particularly with a through hole (17), for stringing said clamping device on a holder.

13. A clamping device as claimed in claim 11, characterized in that the end of at least one of said arm members (1, 2) that forms one part of said slide guide (3) is designed and shaped for being capable of attaching the clamping device to a plane, surface, particularly to any bearing surface, particularly to any suitable wall (8) surface.

14. A clamping device as claimed in claim 6 characterized in that the end of at least one of said arm members (1, 2) that forms one part of said loose slide guide (3) and said suspender member (5) are also provided with a means, particularly with a through hole (17), for stringing said clamping device on a holder.

15. A clamping device as claimed in claim 14, characterized in that the end of at least one of said arm members (1, 2) that forms one part of said slide guide (3) is designed and shaped for being capable of attaching the clamping device to a plane, surface, particularly to any bearing surface, particularly to any surface.

* * * * *